US006653649B2

(12) United States Patent
Clark

(10) Patent No.: US 6,653,649 B2
(45) Date of Patent: Nov. 25, 2003

(54) OPTICAL MEASUREMENT AND INSPECTION METHOD AND APPARATUS HAVING ENHANCED OPTICAL PATH DIFFERENCE DETECTION

(75) Inventor: Bryan Kevin Clark, Mountain View, CA (US)

(73) Assignee: Beyond 3, Fremont, CA (US)

( * ) Notice: Subject to any disclaimer, the term of this patent is extended or adjusted under 35 U.S.C. 154(b) by 113 days.

(21) Appl. No.: 09/933,225

(22) Filed: Aug. 20, 2001

(65) Prior Publication Data

US 2003/0035118 A1 Feb. 20, 2003

(51) Int. Cl.[7] .............................................. G01N 21/86
(52) U.S. Cl. ............................ 250/559.11; 250/559.27; 356/519
(58) Field of Search ..................... 250/559.26, 559.27, 250/559.28, 559.42, 559.45, 559.11, 559.12; 356/480, 481, 503, 504, 517, 519

(56) References Cited

U.S. PATENT DOCUMENTS 4,196,396 A * 4/1980 Smith ......................... 359/336
5,563,707 A * 10/1996 Prass et al. .................. 356/517
5,889,590 A * 3/1999 Duggal et al. ............... 356/519
6,128,081 A * 10/2000 White et al. ................. 356/503

OTHER PUBLICATIONS

Hect, Eugene. Optics. Reading, MA: Addison–Wesley Publishing Company, 1990, Second Edition, p. 368.*

* cited by examiner

Primary Examiner—Stephone B Allen
(74) Attorney, Agent, or Firm—Jeffrey D. Moy; Andrew M. Harris; Weiss, Moy & Harris, P.C.

(57) ABSTRACT

An optical measurement and inspection method and apparatus having enhanced path length detection uses a Fabry-Perot cavity to increase the phase detection sensitivity for light reflected from optical structures within a device under inspection. A partially reflective surface is inserted between an illumination subsystem and the device under inspection and the position of the partially reflective surface may be adjusted by a positioner to create the Fabry-Perot cavity between one or more surfaces within the device under inspection. The detection of phase changes is improved, providing improved sensitivity to optical path differences produced by structures within the device under inspection.

22 Claims, 5 Drawing Sheets

OPTICAL MEASUREMENT AND INSPECTION METHOD AND APPARATUS HAVING ENHANCED OPTICAL PATH DIFFERENCE DETECTION

RELATED APPLICATIONS

This application is related to pending U.S. patent application Ser. No. 09/789,913 entitled "SYSTEM OF BEAM NARROWING FOR RESOLUTION ENHANCEMENT AND METHOD THEREFOR" filed on Feb. 21, 2001, the specification of which is incorporated herein by reference.

BACKGROUND OF THE INVENTION

1. Field of the Invention

This invention relates to optical inspection and measuring systems, and more specifically, to an optical system incorporating a resonator to enhance detection of optical path differences in structures under inspection.

2. Description of the Related Art

Optical structures, such as fiber optic cable, beam splitters, combiners and couplers, as well as active optical components are presently increasing in use and complexity. Optical systems are desirable for secure and high speed processing and communications, so manufacture of optical structures is increasing due to market demands.

Recently, planar optical structures have been developed that incorporate optical devices, fiber interconnects and connectors within a thick layer mounted on a substrate. Planar optical structures enable the manufacture of high-density optical processing and telecommunication systems.

In the manufacturing process, it is necessary to inspect and measure planar optical structures, to determine whether or not they are manufactured to the tolerances demanded by functional requirements and to make necessary adjustments in the manufacturing process to avoid manufacturing defective components.

Typically, these planar optical structures are multi-layer structures comprising regions of differing refractive indices. For example, an optical waveguide may be formed by embedding a channel of rectangular cross section within a surrounding material, wherein the channel has a higher refractive index than the surrounding material. In order to inspect the dimensions of the above-described waveguide, it is necessary to detect the horizontal position of both sides of the waveguide and the vertical thickness of the waveguide. The same measurements can be abstracted to more complex optical structures.

The overall path difference between the cladding and core of an optical structure is due to the relatively thin region of slightly differing refractive indices corresponding to the thickness of the core. Therefore, high sensitivity to small differences in the optical path length (and hence the information containing the dimensions of the optical structures) is desired.

Therefore, it would be desirable to provide an inspection method and apparatus having an enhanced sensitivity to differences in optical path length within a device under inspection.

SUMMARY OF THE INVENTION

The foregoing objectives are achieved in an optical measurement and inspection method and apparatus having enhanced path length measurement sensitivity. The inspection apparatus includes an optical illumination system for producing a beam for illuminating a device under inspection, a detector for detecting light reflected from the device under inspection and resonator positioned between the illumination subsystem and the device whereby the sensitivity to phase of light detected with the detector is improved due to multiple reflections occurring within the resonator.

The foregoing and other objects, features, and advantages of the invention will be apparent from the following, more particular, description of the preferred embodiment of the invention, as illustrated in the accompanying drawings.

DESCRIPTION OF EMBODIMENTS OF THE INVENTION

Figure 1:
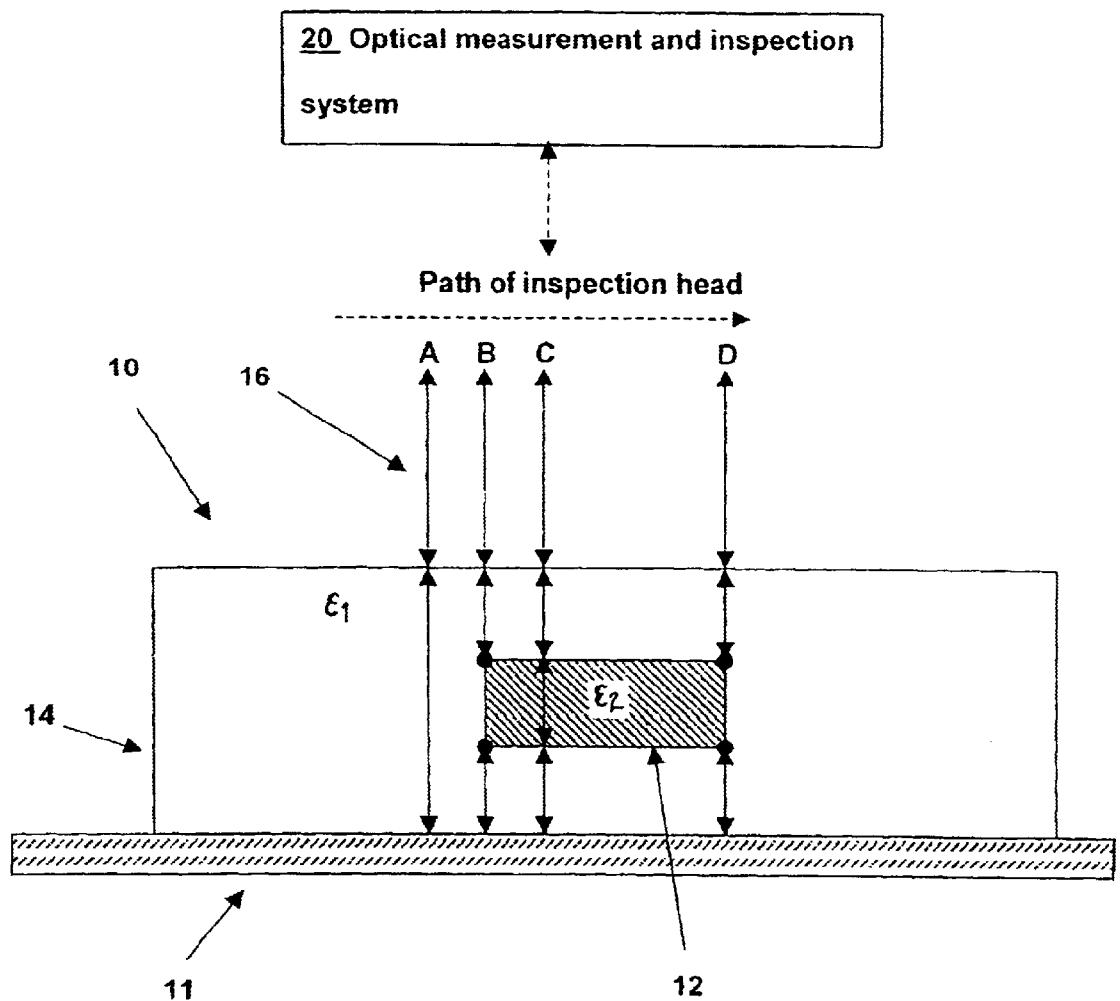
FIG. 1 is an illustration depicting a cross section of an optical device under inspection by an apparatus in accordance with a preferred embodiment of the invention.

With reference now to the figures, and particularly to FIG. 1, a cross section of an optical device 10 under test by an apparatus in accordance with an embodiment of the invention is depicted. A core 12 having a refractive index of $n_2$ is embedded within a cladding 14 having a refractive index of $n_1$. Refractive index $n_2$ is generally higher than refractive index $n_1$, so that the optical field is generally contained within the core 12, but this is not a restriction on the operation of the present invention. A priori knowledge of the ranges of variation in refractive indices and the sizes of features such as core 12 may be used within the system of the present invention to avoid ambiguities and to optimize the operating point of the system of the present invention. A reflective substrate 11 is necessary for operation of the present invention and may either be part of optical device 10 as depicted, or (for transparent optical devices) may be placed beneath optical device 10 during measurement.

While the present invention extends to inspecting and measuring optical structures in general, exemplary dimensions for core 12 are from 1 $\mu$m–5 $\mu$m thickness with a percentage change of the refractive index ratio of cladding 14 to the refractive index of core 12 of 1%. For an inspection wavelength of 0.633 $\mu$m, an optical path length difference of 0.08 wavelength for the largest core size of 5 $\mu$m. Standard phase detection techniques are not sensitive enough to accurately determine dimensions of core 12 in this example. The present invention is embodied in an optical system having an improved phase sensitivity with which it is practical to measure optical devices having the above-exemplified characteristics.

As illustrated in the Figure, an optical measurement and inspection system 20 in accordance with an embodiment of the present invention is positioned above optical device 10 and an inspection head is scanned over the surface of optical device 10, illuminating optical device 10. The reflected beam from substrate 11 generates a beam 16 that contains phase information related to the optical path distance that the transmitted and reflected beam have traveled on an optical path within optical device 10.

In order to measure the dimensions of core 12 (which is the objective of the illustration), beam 16 is scanned across the direction shown in the figure. At point A, the beam has traveled through a path that is twice the thickness of cladding 14, but has not passed through core 12. At point B, a step is encountered, produced by the specular points at the corners of cladding 12. At point C, the beam travels through core 12, and at point D, another step is encountered as the composite beam transitions back to travelling exclusively through cladding 14 with the specular points at the opposite corners of cladding contributing to the phase of the composite beam 16 at point D.

Figure 2:
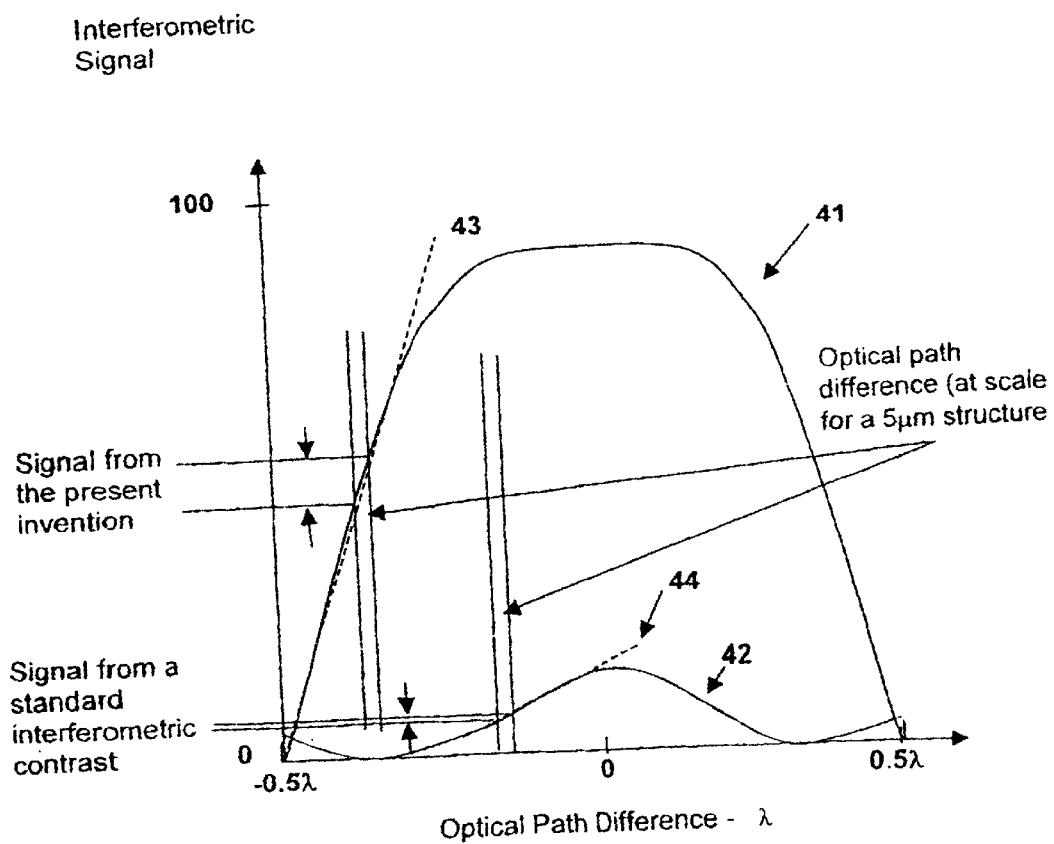
FIG. 2 is a graph depicting the improved phase contrast within the optical measurement and inspection system of FIG. 1.

Referring now to FIG. 2, the enhanced operation of the present invention is illustrated by a graph depicting a standard interferometer intensity as a function of optical path difference through a device under inspection. Intensity curve 42 shows the phase response of a standard interferometer with respect to optical path difference within optical device 10. Phase detection sensitivity is measurable by the slope of the phase response, which is the slope of the interferometer intensity versus optical path difference in the range in which measurements are made. This is depicted as a slope line 44. Intensity curve 41 shows sensitivity increased by almost a factor of six and a corresponding increase in the slope as depicted by phase slope line 43.

One of the problems solved by the present invention is the ability to resolve structures that have small thickness or wherein the refractive index is close to that of the surrounding material. Since the optical path difference under these conditions will be small and the diffraction effects at the boundaries low, a standard interferometer will not produce sufficient phase difference from the features within the structure under test to make the features detectable in the presence of noise or spurious reflection as evidenced by line 44 of the graph of FIG. 2. Standard optical imaging techniques are not useful at all, since the contrast will be lower even than that of the interferometer.

Figure 3:
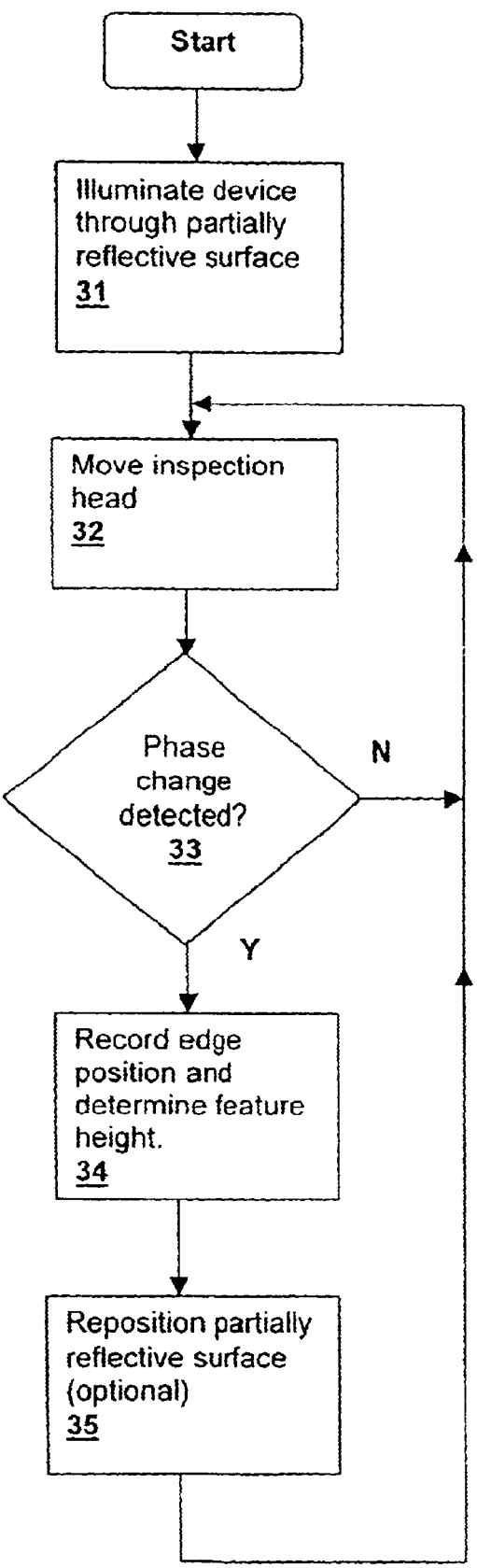
FIG. 3 is a flowchart depicting steps performed within an optical measurement and inspection system in accordance with a preferred embodiment of the invention.

The present invention incorporates a resonator introduced between optical device 10 and the illumination subsystem within optical measurement and inspection system 20. Referring now to FIG. 3, the operation of a system in accordance with the present invention as embodied in a method is depicted in a flowchart. Optical device 10 is illuminated through a partially reflective surface (step 31). The inspection head is moved in the scanning direction (step 32) and the phase of reflection from optical device 10 is observed. If a phase change is detected (step 33), edge height and position are recorded (step 34) (the phase change is due to encountering the edge of core 12). Optionally the partially reflective surface may be repositioned (step 35) to optimize the phase detection capability of the interferometric detector to maintain operation of the detector in the region of high sensitivity depicted by slope line 43 of FIG. 2. In this manner, which is similar to step-and-repeat measurement techniques used in optical imaging systems, the thickness and profile of core 12 may be measured with high accuracy.

Figure 4:
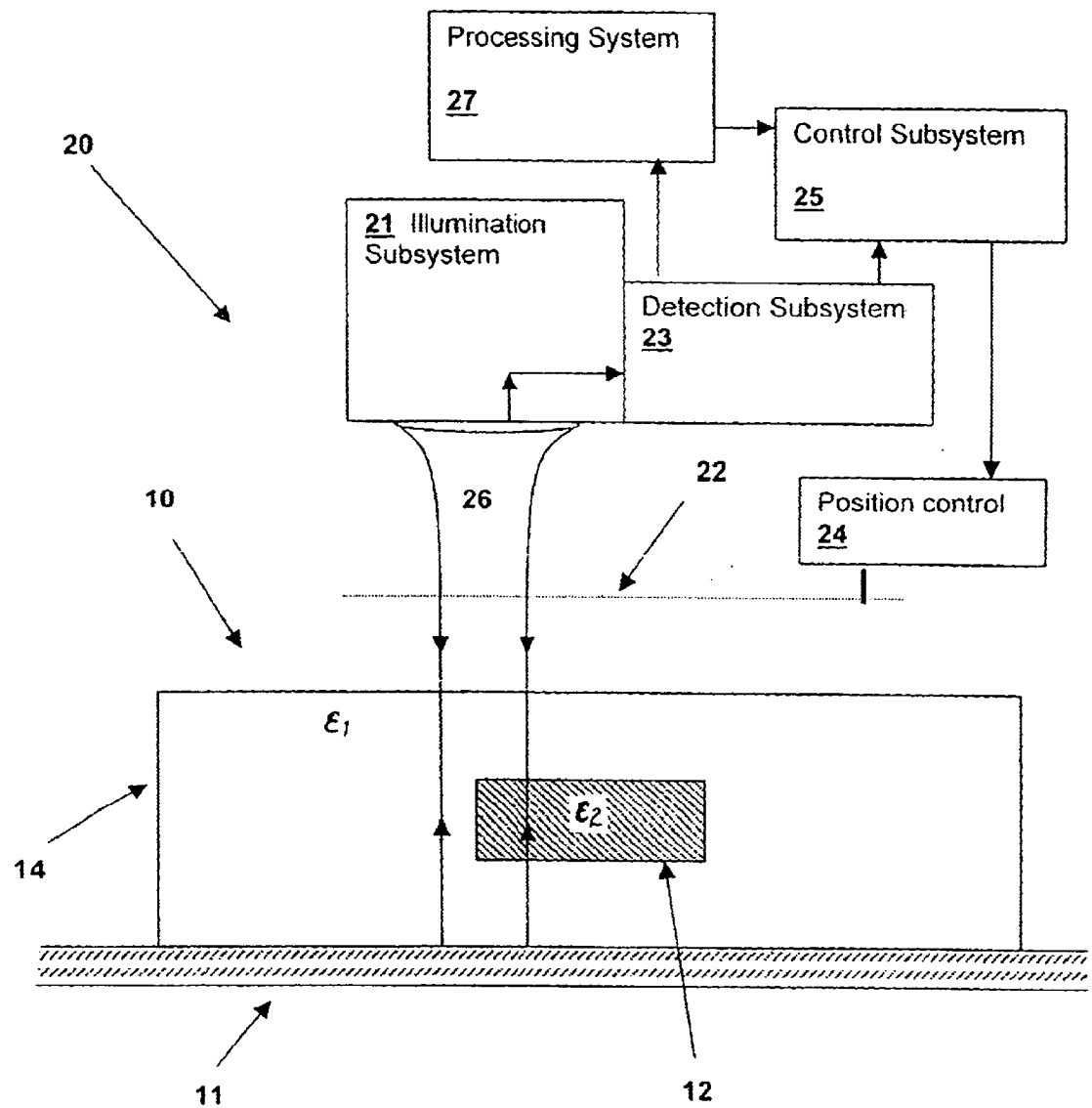
FIG. 4 is an illustration depicting an optical measurement and inspection system in accordance with a preferred embodiment of the invention.

Referring now to FIG. 4, an optical measurement and inspection system 20 in accordance with a preferred embodiment of the invention is depicted. Illumination subsystem 21 produces a transmitted beam that is directed to optical device 10 through a partially reflective surface 22. Partially reflective surface 22 produces a Fabry-Perot cavity within which all or part of optical device 10 is inserted. At the distance at which partially reflective surface 22 forms the optimal Fabry-Perot cavity, the sensitivity (phase slope) of an interferometric phase detector is greatest, due to the resonance condition of the Fabry-Perot cavity. Detection subsystem 23 provides detection of the phase of the reflected beam, permitting measurement of the thickness of core 12, which will produce a particular phase step at detection subsystem 23 when the edge of core 12 is encountered by beam 26.

The presence of partially reflective surface 22 increases the sensitivity of the interferometer around the resonant distance of the Fabry-Perot cavity formed between the partially reflective surface and substrate 11. The partially reflective surface may be a lens within illumination subsystem 21 that may be positioned by position control 24, a separate partially reflective plate again positioned by a position control 24, or a coating or plate placed directly on the device under inspection.

The position of beam 26 when the phase step occurs provides the location of the edge of core 12 and the amount of phase shift determines the thickness. Ambiguity may be resolved by a priori knowledge of the approximate thickness of core 12. Knowledge of the refractive indices $n_1$ and $n_2$ is also needed, in order to relate the phase step to the thickness of core 12.

A control subsystem 25 and position controller 24 are used to implement the steps of the above-described method. Position control 24 is optionally used to move partially reflective surface 22 to positions that will resolve the phase step due to the edges of core 12 more accurately. A processing system 27 is coupled to detection subsystem 23 and position control 24, for controlling the position of partially reflective surface 22 in conformity with stored a priori data associated with optical device 10 and information received from detection subsystem 23. Processing system 27 may thereby adjust the position of partially reflective surface 22 to maximize the phase sensitivity for a particular measurement of an edge or region with a differing optical path length from an adjacent measurement position.

Figure 5A:
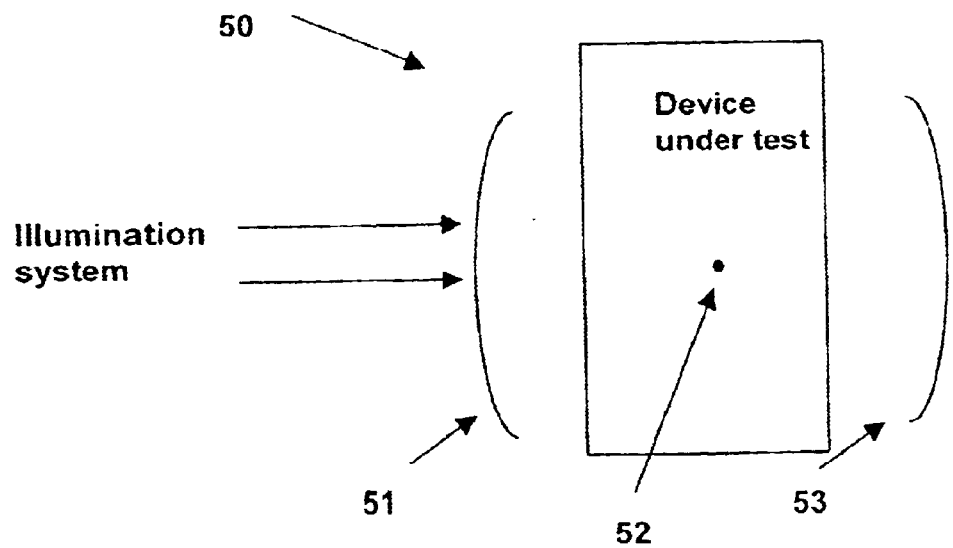
FIGS. 5A and 5B are illustrations depicting resonant structures that may be incorporated in alternative embodiments of the invention.

Referring now to FIG. 5A, an alternative Fabry-Perot resonant structure that may be incorporated as a resonator 50 within an embodiment of the present invention is depicted. A spherical first mirror 51 and a spherical second mirror 53 are positioned with their focal points 52 coincident. The first mirror 51 is partially reflective, so an illumination system may introduce an illuminating beam, and the first mirror 51 and second mirror are positioned to create a resonance condition around the device under test. Increased phase sensitivity according to the same measurement principle may be generated by incorporating spherical first mirror 51 in place of the planar partially reflective surfaces described above and the spherical second mirror 53 replaces the planar substrate described above.

Figure 5B:
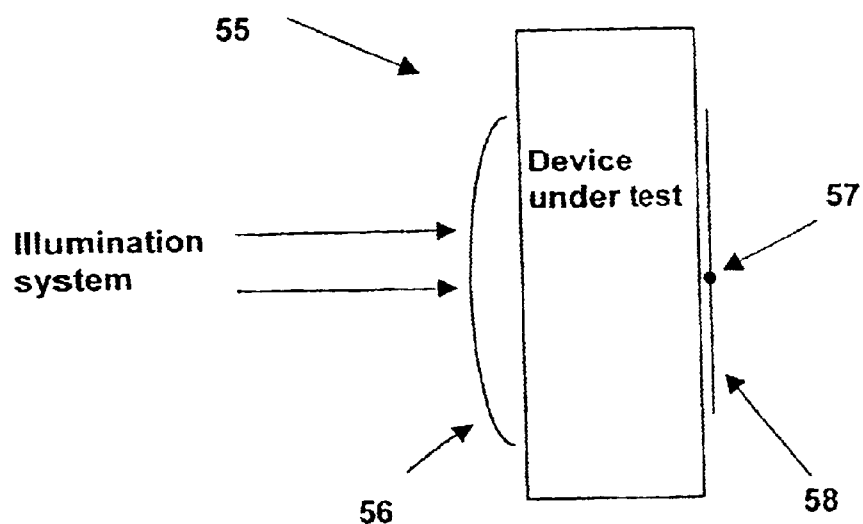

Referring now to FIG. 5B, yet another alternative resonator 55 is disclosed that may be incorporated within the present invention. Resonator 55 comprises a spherical mirror 56 having a focal point 57 within the plane of a planar reflective surface 58. Mirror 56 is partially reflective, so that be introduced from an illumination system. Spherical mirror 56 is positioned with respect to planar reflective surface 58 so that a resonator is formed surrounding the cross-section of a device under test. The phase sensitivity of the measurement system is increased by the resonator as discussed above. Spherical mirror 56 replaces the planar partially reflective surface of the first-described embodiment and planar reflective surface 58 may be a reflective external substrate, or a surface of the device under test.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An optical measurement and inspection system comprising:
    an optical illumination system for producing a beam for illuminating a surface under inspection;
    a detector for measuring light reflected from said surface under inspection;
    a partially reflective surface positioned between said surface under inspection and said detector and forming a resonator with said surface under inspection, wherein said partially reflective surface is positioned at a tuned optical distance from said surface under inspection in conformity with a predetermined wavelength of said optical illumination system, whereby a sensitivity of said detector to light reflected from said surface under inspection is increased due to multiple reflections within said resonator; and
    a scanning system for moving said beam and said partially reflective surface with respect to said surface under inspection, wherein said detector detects variations in an optical path between said partially reflective surface and said surface under inspection in response to said moving.

2. The optical measurement and inspection system of claim 1, wherein said tuned optical distance is selected such that at said predetermined wavelength, said resonator has a response located on a slope of a single resonance of said resonator, whereby a sensitivity of said detector to light reflected from said surface under inspection is increased due to multiple reflections between said partially reflective surface and said surface under inspection.

3. The optical measurement and inspection system of claim 2, wherein said partially reflective surface is a partially reflective spherical surface.

4. The optical measurement and inspection system of claim 2, wherein said partially reflective surface is a substantially planar surface.

5. The optical measurement and inspection system of claim 1, wherein said surface under inspection is an internal surface of a device under inspection.

6. The optical measurement and inspection system of claim 1, wherein said surface under inspection is an at least partially transparent surface and further comprising a reflective surface positioned substantially parallel to said partially reflective surface and on an opposing side of said surface under inspection from said optical illumination system.

7. The optical measurement and inspection system of claim 6, wherein said substrate is a reflective spherical surface.

8. The optical measurement and inspection system of claim 1, wherein said partially reflective surface is a surface of a lens contained within said optical illumination system.

9. The optical measurement and inspection system of claim 8, wherein said partially reflective surface is a coating deposited on said lens.

10. The optical measurement and inspection system of claim 1, further comprising a positioner mechanically coupled to said partially reflective surface for positioning said partially reflective surface at said tuned optical distance from said surface under inspection.

11. The optical measurement and inspection system of claim 10, further comprising a controller coupled to said positioner for adjusting said position of said partially reflective surface in response to a signal received from said detector.

12. The optical measurement and inspection system of claim 10, further comprising:
    a controller coupled to said positioner for adjusting said position of said partially reflective surface; and
    a processing system containing storage, said storage having data corresponding to expected features of said surface under inspection, and wherein said processing system is coupled to said controller and wherein said position is adjusted in conformity with said data.

13. The optical measurement and inspection system of claim 12, wherein said processing system is further coupled to an output of said detector, whereby said position is further adjusted in conformity with said output of said detector.

14. The optical measurement and inspection system of claim 1, wherein said scanning system moves said partially reflective surface and said optical illumination subsystem in an axis substantially parallel to a surface of said surface under inspection.

15. The optical measurement and inspection system of claim 1, wherein said scanning system moves said surface under inspection in an axis substantially parallel to said partially reflective surface.

16. A method for measuring and inspecting an optical device, said method comprising:
    illuminating a partially reflective surface with an illumination beam from an illumination subsystem;
    illuminating a surface under inspection of said optical device with a transmitted beam that is transmitted from said illumination beam through said partially reflective surface, wherein said partially reflective surface and said surface under inspection are positioned substantially parallel to each other and at a tuned optical distance with respect to a predetermined wavelength of said illumination subsystem forming a resonator;
    scanning said transmitted beam and said partially reflective surface across said surface under inspection; and
    detecting a reflected beam from said surface under inspection, and wherein a sensitivity of said detector to light reflected from said surface under inspection is increased due to multiple reflections within said resonator, and repeating said scanning and detecting whereby said detecting detects variations in an optical path between said partially reflective surface and said surface under inspection in response to said scanning.

17. The method of claim 16, wherein said optical device is a transparent device, and further comprising positioning a reflective substrate beneath said transparent device prior to said detecting.

18. The method of claim 16, further comprising adjusting a position of said partially reflective surface with respect to said surface under inspection whereby said tuned optical distance is adjusted.

19. The method of claim 18, wherein said adjusting is performed in response to said detecting.

20. The method of claim 18, further comprising retrieving data corresponding to a priori information about said surface under inspection and wherein said adjusting is performed in response to said retrieving.

21. The method of claim 20, wherein said adjusting is further performed in response to said detecting.

22. The method of claim 16, wherein a sensitivity of said detector to of light reflected from said device is increased by selecting said tuned optical distance such that at said predetermined wavelength, said resonator has a response located on a slope of a single resonance of said resonator.

* * * * *